(12) United States Patent
Hurt et al.

(10) Patent No.: US 6,933,859 B2
(45) Date of Patent: Aug. 23, 2005

(54) LATERAL ACCELERATION INDICATOR FOR AIRCRAFT

(75) Inventors: Kenneth T. Hurt, Surprise, AZ (US); Thomas M. Leard, Carefree, AZ (US); John A. Woltkamp, Fountain Hills, AZ (US); Iris K. Rundle, Peoria, AZ (US); Andrew E. Elliott, Bothell, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/637,307

(22) Filed: Aug. 7, 2003

(65) Prior Publication Data

US 2005/0030204 A1 Feb. 10, 2005

(51) Int. Cl.$^7$ .............................................. G08B 21/00
(52) U.S. Cl. ............................ 340/945; 340/979; 701/4
(58) Field of Search ................................ 340/945, 973, 340/974, 975, 979; 701/4, 14

(56) References Cited

U.S. PATENT DOCUMENTS

| | | | | |
|---|---|---|---|---|
| 4,470,819 A | * | 9/1984 | Seay et al. ..................... | 434/49 |
| 5,420,582 A | * | 5/1995 | Kubbat et al. ................ | 340/974 |
| 6,405,107 B1 | * | 6/2002 | Derman ......................... | 701/3 |
| 6,567,014 B1 | * | 5/2003 | Hansen et al. ................ | 340/980 |
| 6,686,851 B1 | * | 2/2004 | Gordon et al. ................ | 340/970 |

* cited by examiner

Primary Examiner—John Tweel, Jr.

(57) ABSTRACT

An electronic lateral acceleration indicator is provided that gives improved visual performance over previous electronic indicators. In a first embodiment, the lateral acceleration indicator includes a fine tuning element and a high level lateral acceleration element. The fine tuning element provides a precise reading of low level lateral acceleration. This allows a pilot to make small corrections to eliminate small amounts of lateral acceleration. The high level lateral acceleration element provides a strong visual indication when relatively high lateral acceleration is present. The strong visual indication provided by the high level lateral acceleration element increases the probability that the pilot will be made aware of the lateral acceleration. Thus, the lateral acceleration indicator of the present invention provides both fine tuning capability and a strong visual warning of large lateral acceleration to the pilot. In a second embodiment, the lateral acceleration indicator includes a lateral acceleration element that expands as lateral acceleration increases. This allows the pilot to quickly determine if lateral acceleration is occurring. Additionally, the rate of expansion in the lateral acceleration element relative to the increase in lateral mistrim can be tailored to provide improved visual scaling to the pilot.

17 Claims, 10 Drawing Sheets

LATERAL ACCELERATION INDICATOR FOR AIRCRAFT

FIELD OF THE INVENTION

This invention generally relates to avionics systems, and more specifically relates to lateral acceleration indicators.

BACKGROUND OF THE INVENTION

In modern aircraft, it is of critical importance to provide accurate and timely information to the pilot to facilitate effective flight management. The nature of the pilot's various tasks determines the general types of data which must be made available to the pilot. In a display system it is important to provide each type of data in a form best suited for that data type. Preferably, each form of data is presented in a manner suited for use such that extensive mental processing is not required before information can be used by the pilot. Thus, in a properly configured display, more information can be presented to the pilot and utilized with less effort in mental processing, and can be expected to translate into fewer pilot errors.

Many modern aircraft displays utilize computer generated electronic images to offer significant advances in their ability to provide a wide range of information to the pilot. One type of instrument that is commonly included in modern aircraft displays are lateral acceleration indicators. Lateral acceleration indicators, sometimes also referred to as "slip-skid" indicators or simply slip indicators, are used to provide visual indication of lateral mistrim to the pilot.

Lateral mistrim, sometimes referred to as uncoordinated flight, slipping or skidding, occurs when the tail of the aircraft is not properly situated behind the front of the aircraft. Lateral mistrim is undesirable in that it is generally inefficient, and can thus result in excessive fuel consumption. Additionally, lateral mistrim can make the flight uncomfortable. Finally, lateral mistrim can be an indication of a greater problem such as a loss of power in an engine, and can itself result in a loss of control during certain low speed maneuvers. For all these reasons, it is strongly desirable to provide a good visual indication of lateral mistrim to the pilot.

Early lateral acceleration indicators were relatively simple mechanical devices that used a ball in a concave glass enclosure. During coordinated flight, the ball remained in the center of the glass enclosure. When lateral mistrim occurred, the ball moved from the center and thus provided visual indication to the pilot. While these early mechanical indicators provided effective visual representation of mistrim, they were not compatible with modern electronic displays used in new systems.

There have been several attempts at incorporating lateral acceleration indicators into electronic displays. These electronic indicators have suffered from some limitations, namely, the have not provided both visual indication of small amounts of lateral mistrim and a strong visual indication for large amounts of lateral mistrim.

Thus, what is needed is an improved electronic lateral acceleration indicator that provides the ability to indicate small amounts of lateral mistrim and also provides strong visual indication when large amounts of lateral mistrim are occurring.

BRIEF SUMMARY OF THE INVENTION

The present invention provides an electronic lateral acceleration indicator that provides improved visual performance over previous electronic indicators. In a first embodiment, the lateral acceleration indicator includes a fine tuning element and a high level lateral acceleration element. The fine tuning element is to provide a precise reading of low level lateral acceleration. This allows a pilot to make small corrections to eliminate small amounts of lateral acceleration. The high level lateral acceleration element provides a strong visual indication when relatively high lateral acceleration is present. The strong visual indication provided by the high level lateral acceleration element increases the probability that the pilot will be made aware of the lateral acceleration. Thus, the lateral acceleration indicator of the present invention provides both fine tuning capability and a strong visual warning of large lateral acceleration to the pilot.

In a second embodiment, the lateral acceleration indicator includes a lateral acceleration element that expands as lateral acceleration increases. This allows the pilot to quickly determine if lateral acceleration is occurring. Additionally, the rate of expansion in the lateral acceleration element relative to the increase in lateral mistrim can be tailored to provide improved visual scaling to the pilot.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides an electronic lateral acceleration indicator that provides improved visual performance over previous electronic indicators. In a first embodiment, the lateral acceleration indicator includes a fine tuning element and a high level lateral acceleration element. The fine tuning element provides a precise reading of low level lateral acceleration. This allows a pilot to make small corrections to eliminate even very small amounts of lateral acceleration. The high level lateral acceleration element provides a strong visual indication when relatively high lateral acceleration is present. The strong visual indication provided by the high level lateral acceleration element increases the probability that the pilot will be made aware of the lateral acceleration. Thus, the lateral acceleration indicator of the present invention provides both fine tuning capability and a strong visual warning of large lateral acceleration to the pilot.

In a second embodiment, the lateral acceleration indicator includes a lateral acceleration element that expands as lateral acceleration increases. This allows the pilot to quickly determine if lateral acceleration is occurring. Additionally, the rate of expansion in the lateral acceleration element relative to the increase in lateral mistrim can be tailored to provide improved visual scaling to the pilot.

Figure 1:
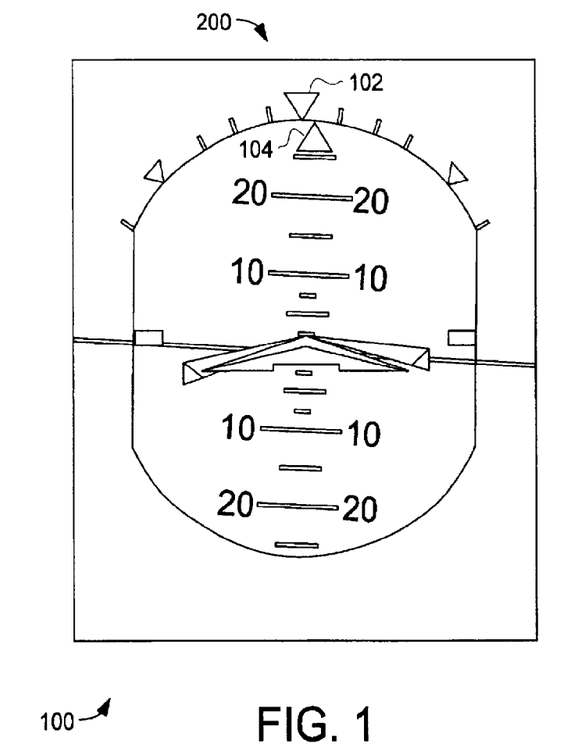
FIG. 1 is an illustrative view of an exemplary lateral acceleration indicator implemented as part electronic attitude indicator.

Turning now to FIG. 1, an electronic attitude director indicator (EADI) 100 that includes a lateral acceleration indicator 200 is illustrated. In general, electronic attitude director indicators provide aircraft pitch and roll (attitude) information. These indicators typically include aircraft reference symbols, a horizon line, and pitch lines to represent the specific plus or minus pitch values. They also typically include a roll scale with markings and a roll pointer. Further, a fixed pointer (sky pointer) is commonly provided as a reference for the zero roll (wings level) position. In addition, when flight director command bars controlled by a computer are displayed to guide the pilot following the pilot programmed flight guidance modes.

The EADI 100 illustrated in FIG. 1 is an example of the type of display environment in which the lateral acceleration indicator 200 can be implemented. Of course, it should be noted that the EADI 100 is merely one example of such an environment, and that the lateral acceleration indicator 200 can be implemented in a variety of different configurations. More information regarding exemplary attitude indicators can be found in U.S. Pat. No. 5,412,382 issued to Leard et al and assigned to Honeywell Inc. The exemplary EADI 100 includes sky pointer 102 and a roll pointer 104 used to indicate the roll position of the aircraft. As will become clear, in one embodiment of the present invention a lateral acceleration indicator is implemented with the roll pointer 104.

It should be noted that while the EADI 100 is illustrated as a stand alone display, the EADI 100 can also be implemented as part of a more comprehensive electronic primary flight display. Primary flight displays are multifunction display units that provide a wide range of data to the pilot and can replace several different discrete indicators. Other examples of the types of instruments and data that can be displayed in a primary flight display include altimeters, vertical speed indicators, horizontal situation indicators, weather and navigation information, heading information and angle of attack indicators.

It should also be noted that while the lateral acceleration indicator will now be illustrated implemented with a roll indicator in an electronic attitude director indicator, that the lateral acceleration indicator could also be implemented in a variety of forms in a variety of different display environments. For Example, the slip skid indicator could be a dedicated display above the ADI, inside the middle of the ADI, or below it. In these embodiments, the mechanism used to present small mistrims and large mistrim, including the tailoring of the visual feedback, would use similar implementations.

The lateral acceleration indicator, whether implemented individually, as part of an EADI or other indicator, or as part of an overall primary flight display, can be implemented with any suitable electronic display technology. Examples of the types of technologies used to implement suitable displays include LCD and CRT technologies.

Figure 2:
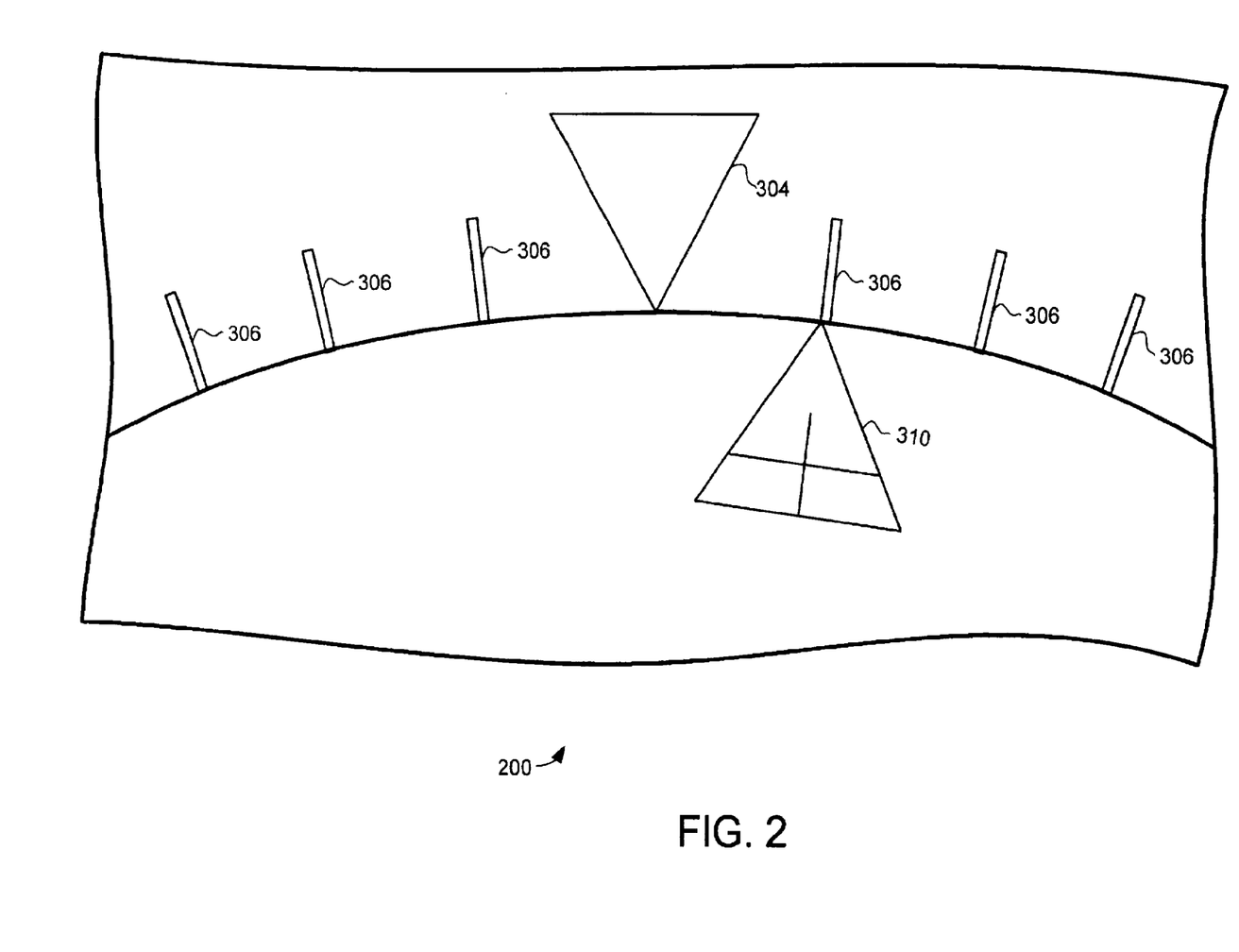
FIGS. 2–8 are schematic views of a first embodiment lateral acceleration indicator at various levels of lateral mistrim.

Turning now to FIG. 2, a portion 200 of an EADI that includes a lateral acceleration indicator is illustrated in more detail. The EADI portion 200 includes a sky pointer 304, a roll pointer 310, and bank indicator lines 306. In FIG. 2, the EADI portion 200 is shown illustrating a 10 degree right roll by the rotated position of the roll pointer 310. Thus, the EADI portion 200 can function as a typical electronic attitude indicator.

Figure 3:
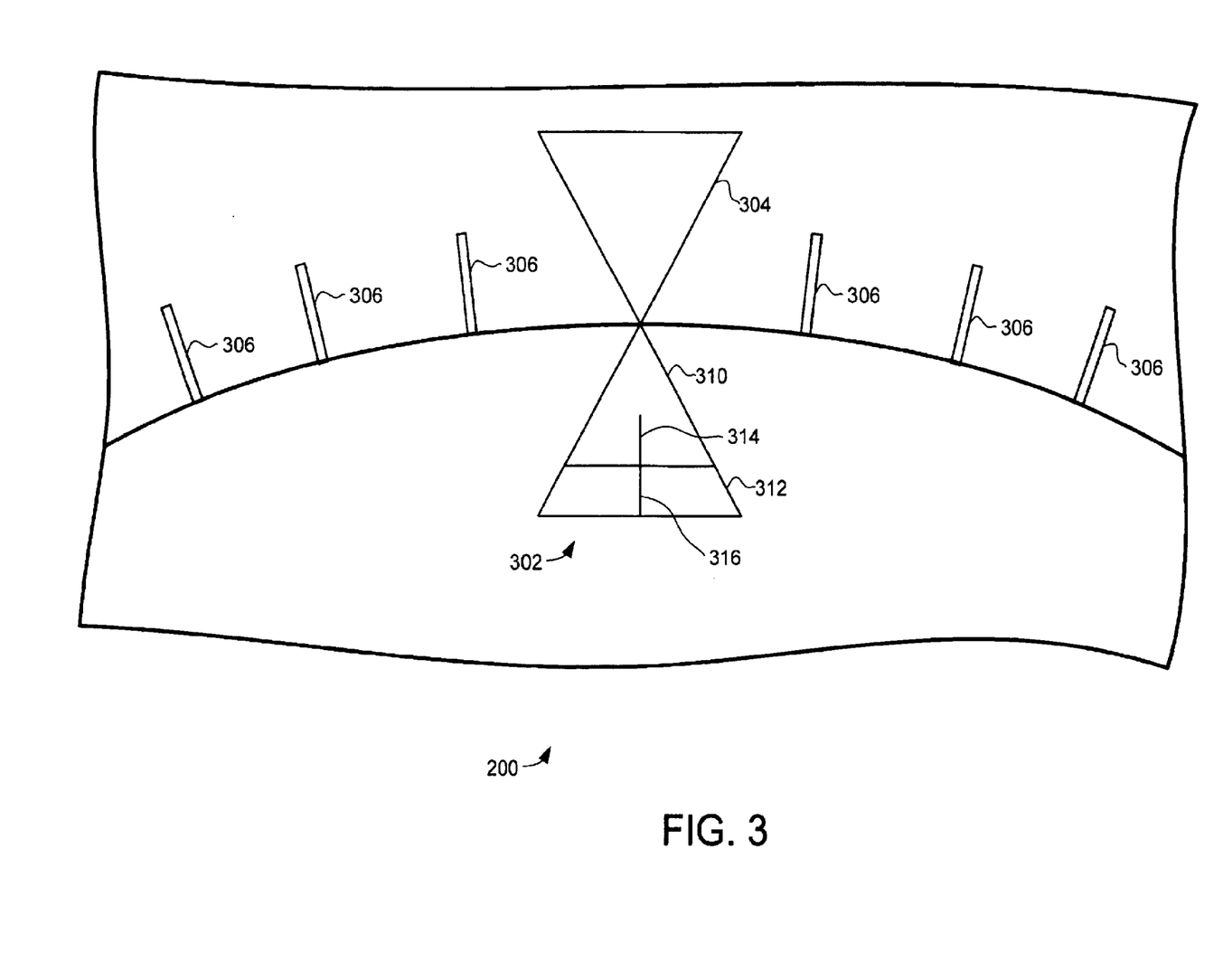

Turning now to FIG. 3, the EADI portion 200 with a lateral acceleration indicator is shown for a wings level attitude. In the embodiment illustrated in FIG. 3, the lateral acceleration indicator includes a fine tuning element and a high level lateral acceleration element. In particular, the fine tuning element comprises a center mark 314 and a floating mark 316 used to provide a precise reading of low level lateral acceleration. The high level lateral acceleration element comprises an indicator shape 312 that slides and expands to indicate larger amounts of lateral acceleration.

Figure 4:
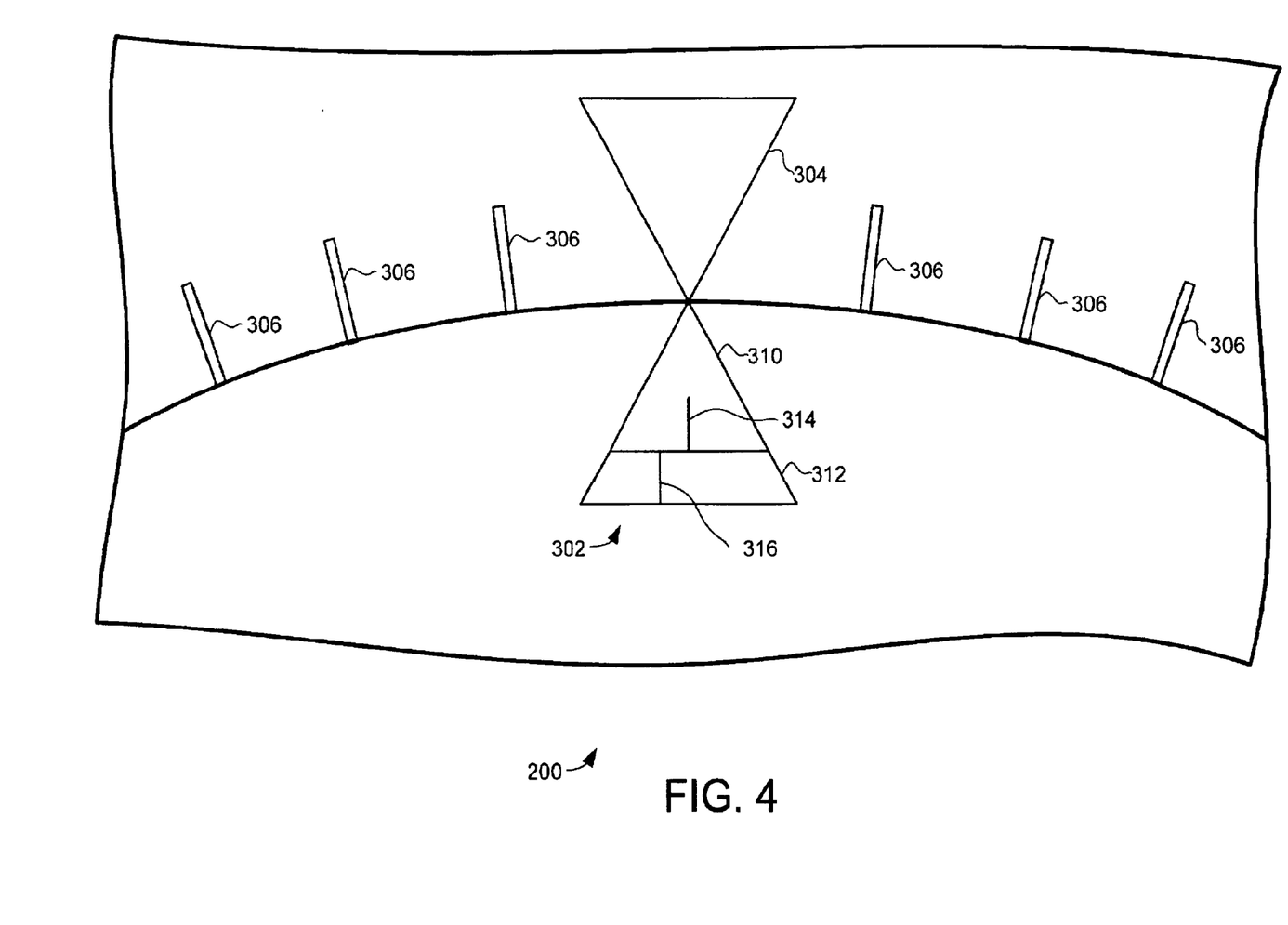

Turning now to FIG. 4, the lateral acceleration indicator 302 is illustrated indicating a low level of lateral mistrim. When no lateral mistrim exists, the floating mark 316 is lined with the center mark 314. As shown in FIG. 4, when indicating a low level of lateral mistrim, the floating mark 316 slides away from the center mark 314 in proportion to and in the direction of the small amount of lateral mistrim. Thus, a pilot can accurately ascertain even low levels of lateral mistrim and use the lateral acceleration indicator 302 to effectively eliminate these low levels of lateral mistrim. The fine tuning element as illustrated has the additional advantage of being unobtrusive and thus does not provide undue distraction to the pilot when it is not being directly viewed.

Figure 5:
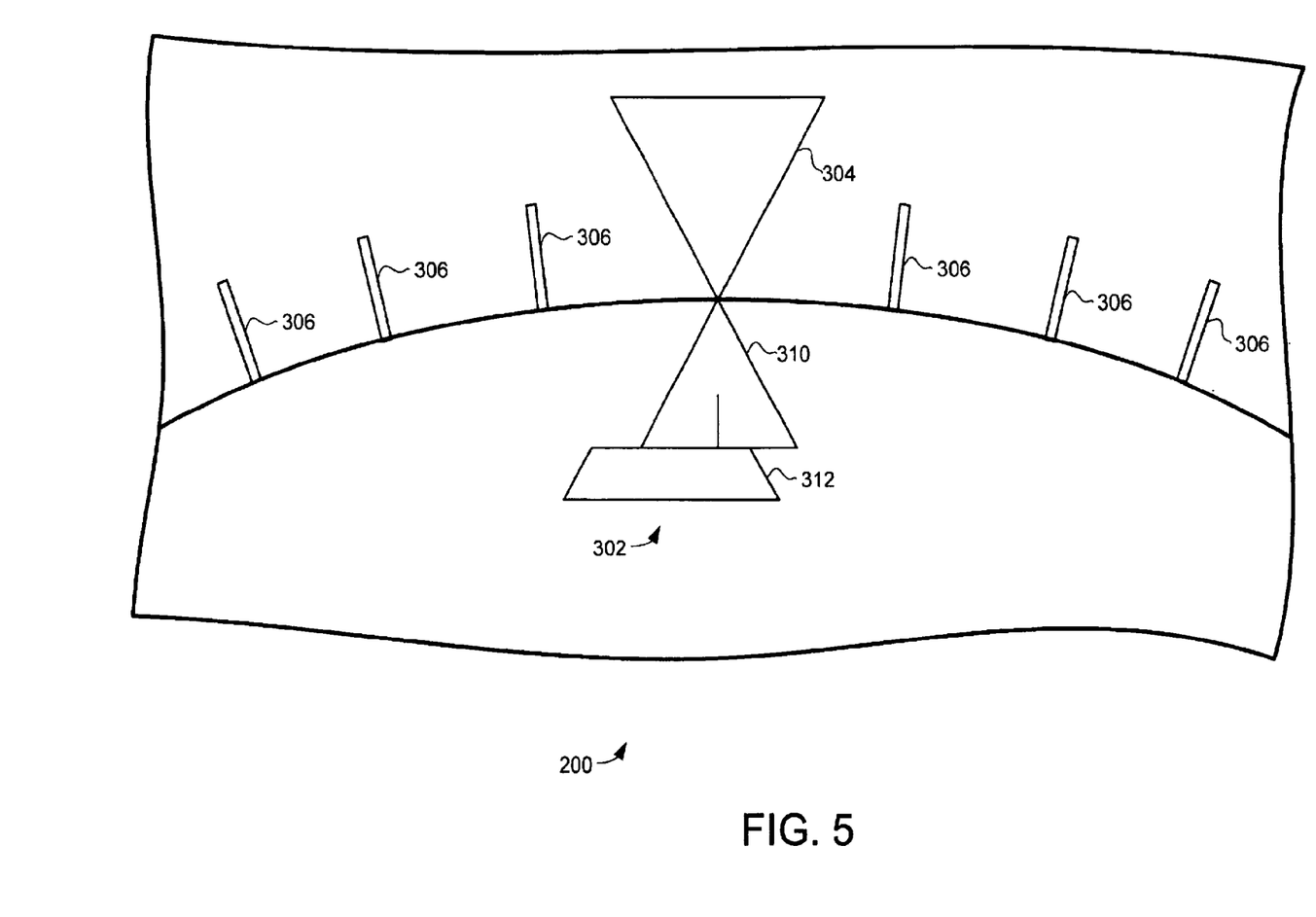
Figure 6:
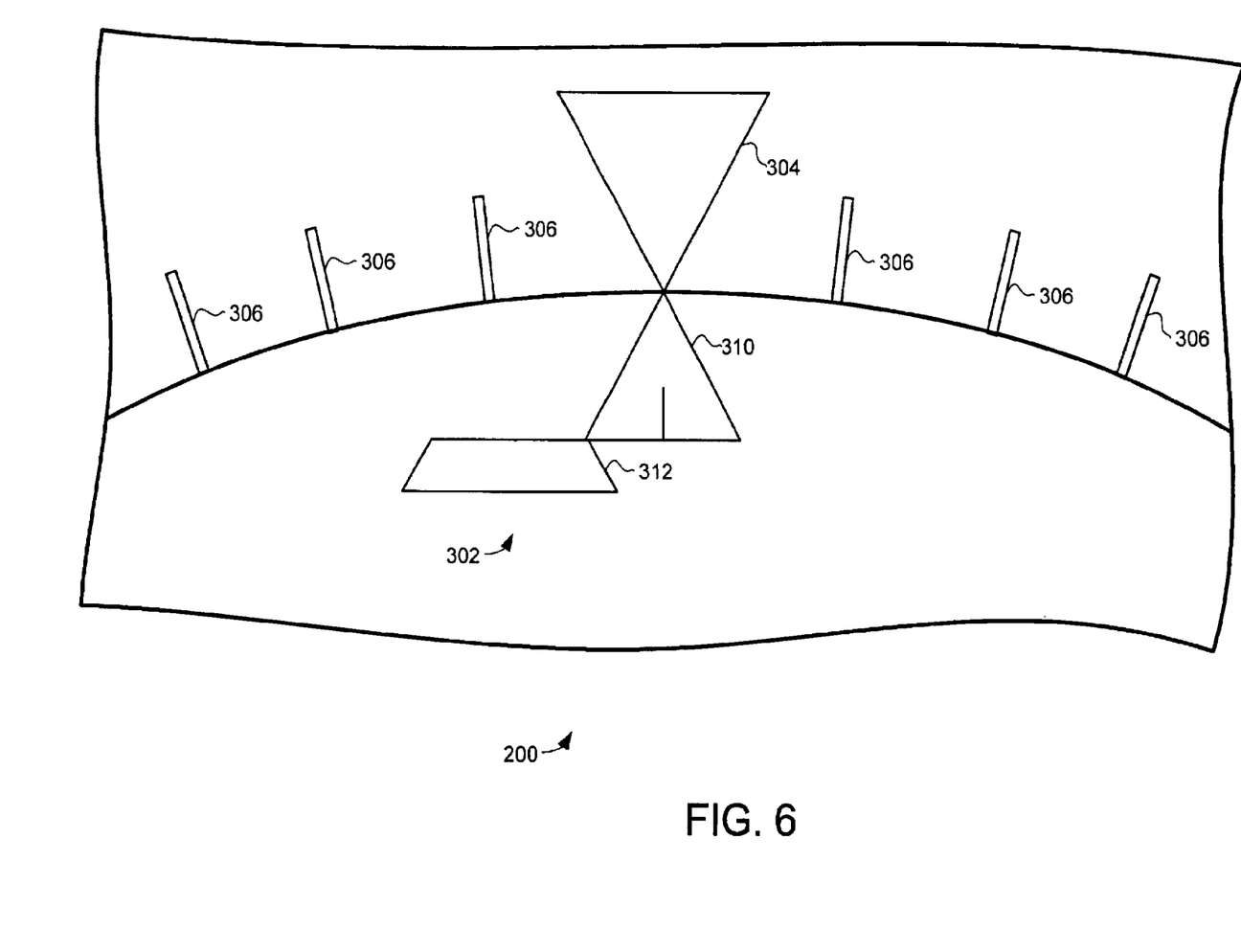

Turning now to FIG. 5, the lateral acceleration indicator 302 is illustrated indicating an intermediate level of lateral mistrim. The lateral acceleration indicator 302 uses the high level lateral acceleration element to indicate intermediate and larger levels or lateral mistrim. In the illustrated embodiment, the lateral acceleration indicator 302 comprises a indicator shape 312 that is slid to indicate intermediate levels of lateral mistrim. As lateral mistrim increases beyond a first level, the indicator shape 312 begins to slide in the direction of the lateral mistrim, as illustrated in FIG. 5. As lateral mistrim continues to increase to a still higher level, it eventually reaches the end of the sliding range. An example of this condition is illustrated in FIG. 6, where the indicator shape 312 is shown slid to the end of the roll pointer 310.

Figure 7:
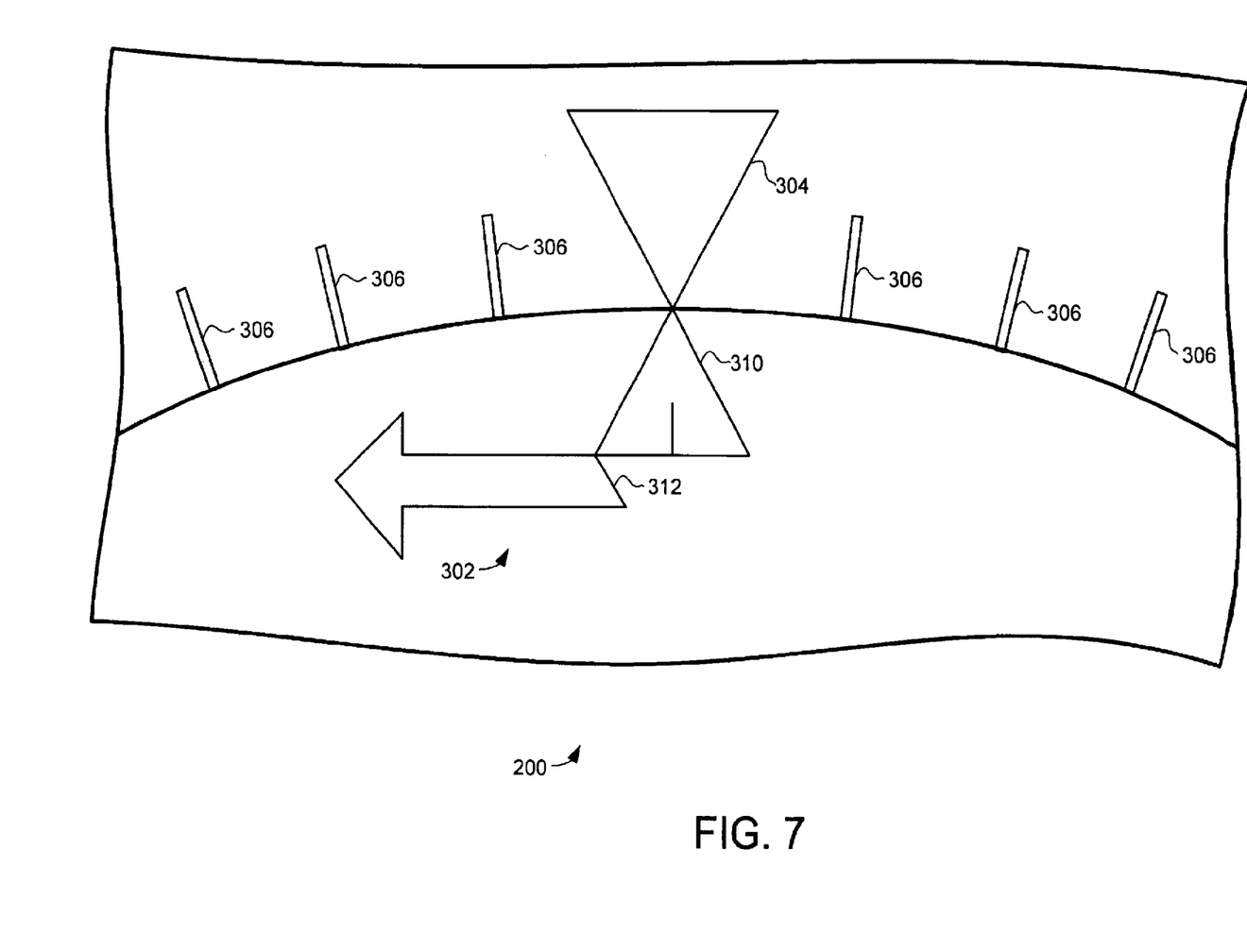

As the lateral mistrim continues to increase beyond this second level, the indicator shape 312 expands to indicate the still greater amount of lateral mistrim. Turning now to FIG. 7, the lateral acceleration indicator 302 is illustrated showing the indicator shape 312 expanding to the shape of an arrow. The larger expanded indicator shape 312 provides increased visual indication of the lateral mistrim, and thus provides a greater likelihood that the pilot will notice the existence of the relatively large amount of lateral mistrim. It should be noted that while FIG. 7 illustrates the indicator shape expanding to the shape of arrow, that this is just one example of the type of expansion that can be utilized to indicate an increased lateral mistrim.

Figure 8:
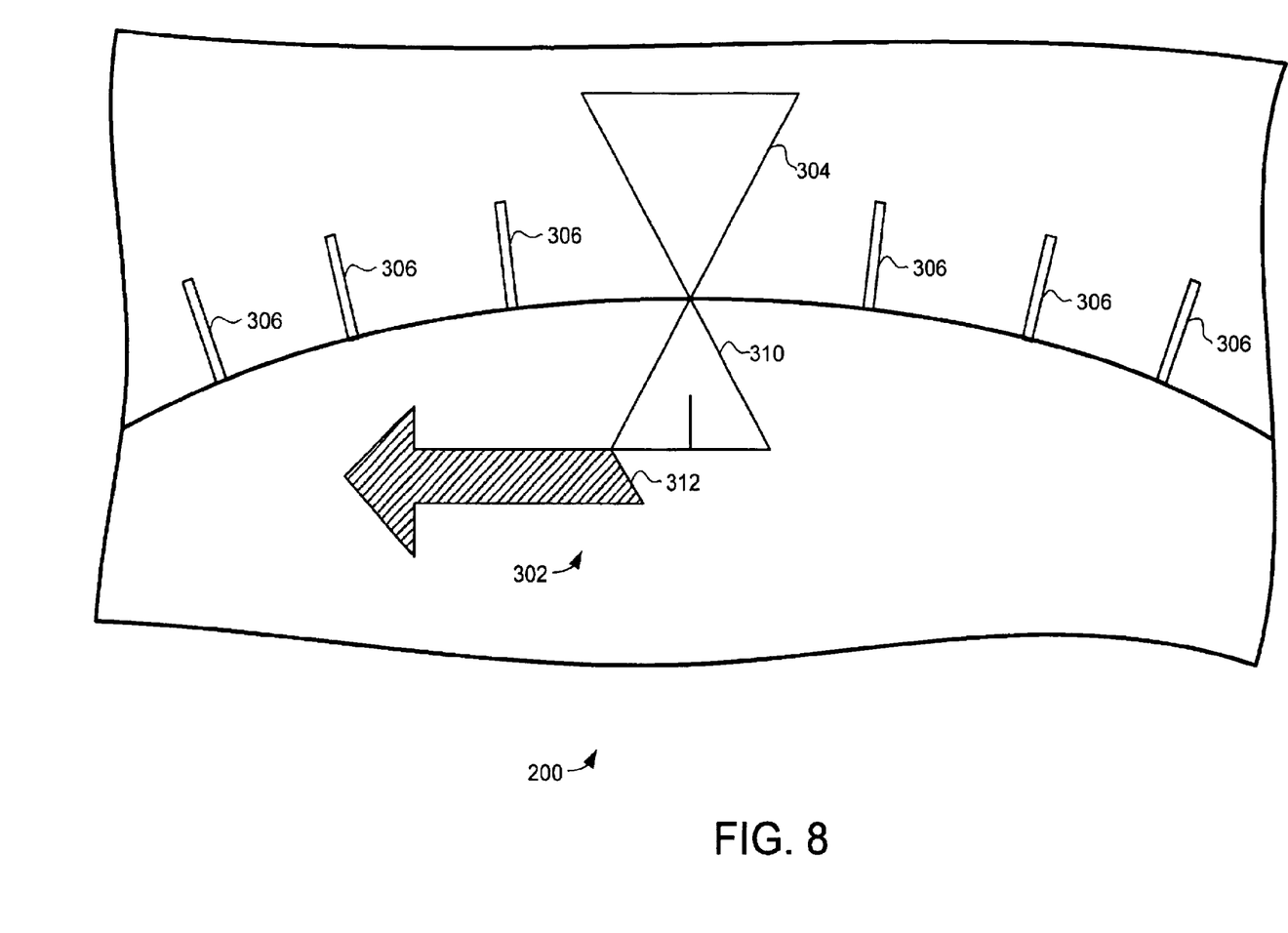

As lateral mistrim continues to increase beyond a third level, a further indication of lateral mistrim can be provided by providing a color change to the indicator shape 312. Turning now to FIG. 8, the lateral acceleration indicator 302 is illustrated showing the indicator shape 312 with a color change indicating a still greater amount of lateral mistrim. Preferably, the color change is selected to provide a still stronger visual indication of the amount of lateral mistrim, again increasing the likelihood that the pilot will be made aware of the high level of lateral mistrim. As an example color scheme, the original color of the indicator shape 312 can typically comprise white, and then change to a color that would enhance situational awareness such as amber when the lateral mistrim exceeds the third level.

It should be noted that while the embodiment illustrated in FIGS. 2–8 shows an implementation where the high level lateral acceleration element first slides, then expands, and finally changes color to indicate increasing levels of lateral mistrim, that the order of these visual indications can be changed and modified to meet particular requirements.

Figure 9:
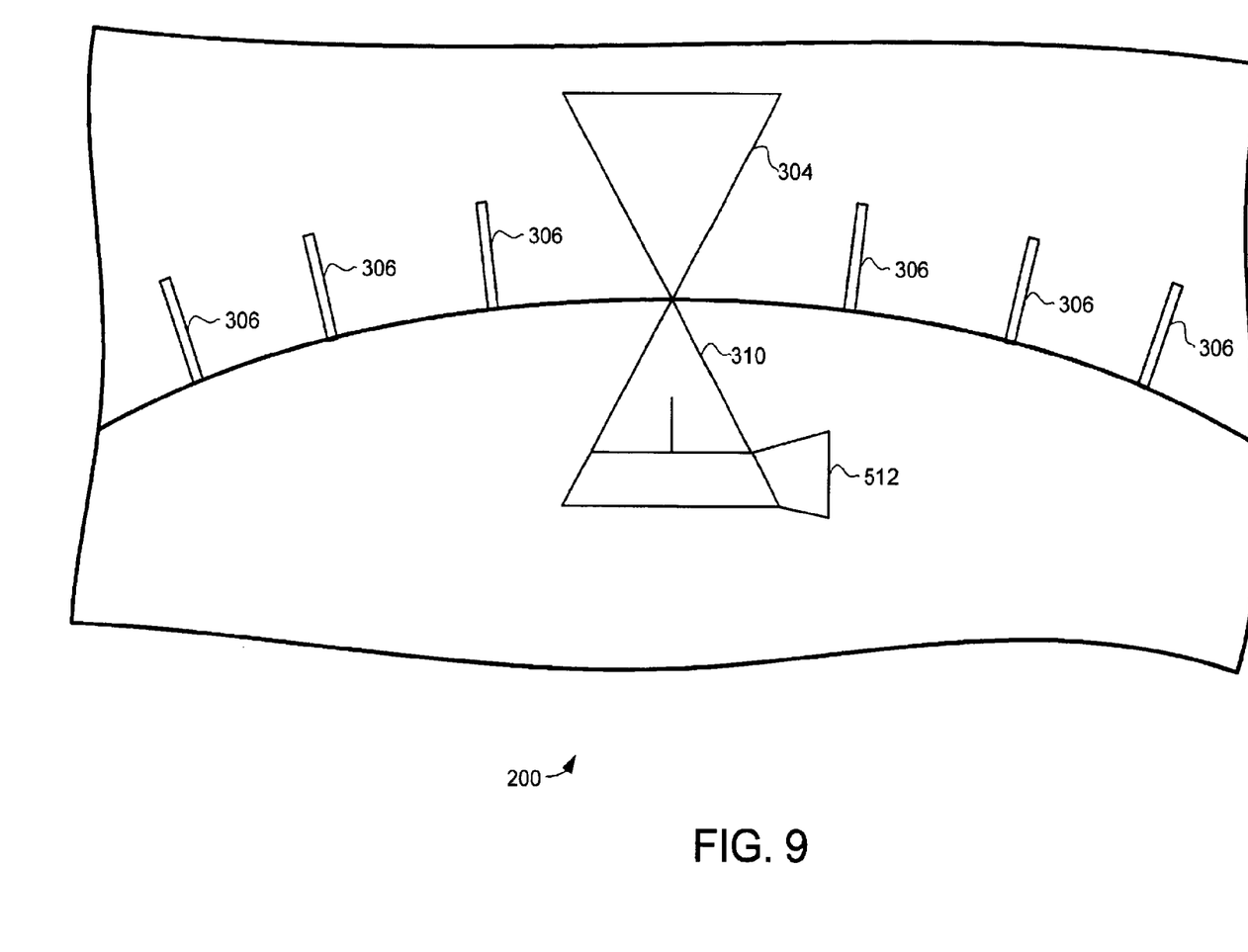
FIGS. 9–10 are schematic views of a second embodiment lateral acceleration indicator at various levels of lateral mistrim.
Figure 10:
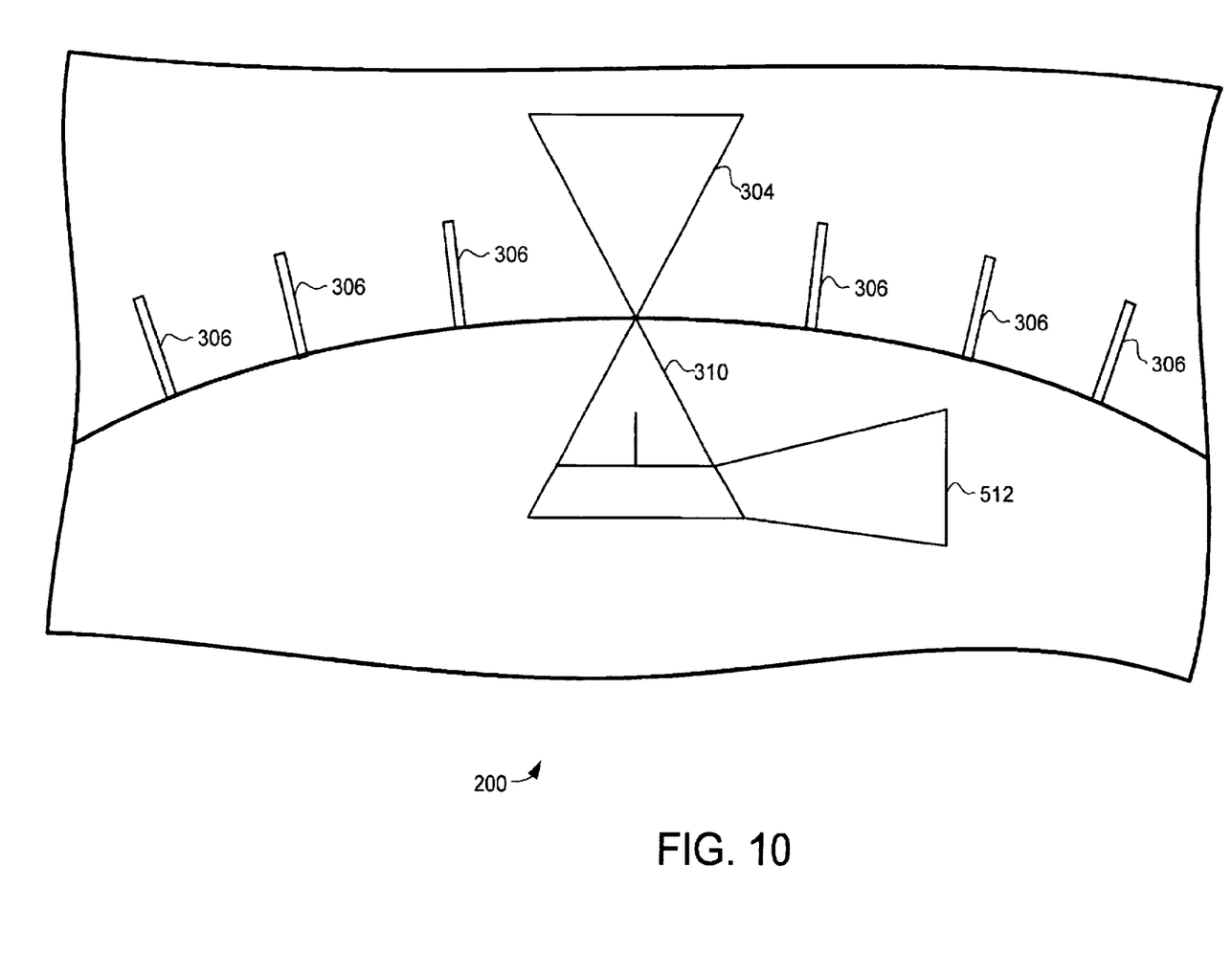

Turning now to FIGS. 9–10, a second embodiment of the lateral mistrim indicator is illustrated. In this embodiment, the lateral acceleration indicator more simply expands in size and/or shape as the lateral mistrim increases. Specifically, FIG. 9 shows how the lateral acceleration indicator shape 512 can simply expand in shape to indicate a level of lateral mistrim, with the shape expanding in the direction of the lateral mistrim. In this case, as lateral acceleration increases, the shape continues to expand. Such a situation is illustrated in FIG. 10, where the lateral acceleration indicator shape 512 has expanded to provide a strong visual indication of increased lateral mistrim.

It should be noted that the expanding indicator shape 512 can be combined with the fine tuning element such as the center mark 314 and the floating mark 316. Additionally, the expanding indicator shape 512 can be combined with changes in color or brightness to further indicate changing levels of lateral acceleration.

One issue in implementing a lateral acceleration indicator is scaling of changes in the indicator. For example, in the embodiments illustrated in FIGS. 2–8, different scaling can be used during low levels of lateral acceleration and high levels of lateral acceleration. This would allow the display response to be tailored to the specific installation. The result would be to minimize the indicator's movement into the more attention getting symbology range until it was, for that aircraft installation, appropriate. Additionally, different levels of lateral acceleration can be selected to serve as breakpoints between low levels indicated by the floating and center mark and the greater levels indicated by sliding of the shape, the expansion of the shape, and the color change of the shape. By tailoring the scale and the first, second and third transition levels, the lateral acceleration indicator can be implemented to provide both fine tuning control and high visual warning at appropriate levels for the aircraft in question.

The present invention thus provides an electronic lateral acceleration indicator that provides improved visual performance over previous electronic indicators. In a first embodiment, the lateral acceleration indicator includes a fine tuning element and a high level lateral acceleration element. The fine tuning element is to provide a precise reading of low level lateral acceleration. This allows a pilot to make small corrections to eliminate small amounts of lateral acceleration. The high level lateral acceleration element provides a strong visual indication when relatively high lateral acceleration is present. The strong visual indication provided by the high level lateral acceleration element increases the probability that the pilot will be made aware of the lateral acceleration. Thus, the lateral acceleration indicator of the present invention provides both fine tuning capability and a strong visual warning of large lateral acceleration to the pilot. In a second embodiment, the lateral acceleration indicator includes a lateral acceleration element that expands as lateral acceleration increases. This allows the pilot to quickly determine if lateral acceleration is occurring. Additionally, the rate of expansion in the lateral acceleration element relative to the increase in lateral mistrim can be tailored to provide improved visual scaling to the pilot.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A lateral acceleration indicator in an electronic display, the lateral acceleration indicator indicating lateral acceleration in an aircraft, the lateral acceleration indicator comprising:
   a fine tuning element, the fine tuning element providing indication of relatively small levels of lateral acceleration; and
   a high level lateral acceleration element, the high level lateral acceleration element providing a stronger visual indication of relatively high levels of lateral acceleration.

2. The lateral acceleration indicator of claim 1 wherein the lateral acceleration indicator comprises a portion of a roll pointer in an attitude indicator.

3. The lateral acceleration indicator of claim 1 wherein the fine tuning element comprises a center mark and a floating mark for indicating the relatively small levels of lateral acceleration.

4. The lateral acceleration indicator of claim 3 wherein floating mark is moved away from the center mark to indicate lateral acceleration.

5. The lateral acceleration indicator of claim 1 wherein the high level lateral acceleration element comprises a indicator shape, the indicator shape sliding as lateral acceleration increases past a first level.

6. The lateral acceleration indicator of claim 5 wherein the indicator shape expands in size as lateral acceleration increases past a second level.

7. The lateral acceleration indicator of claim 6 wherein the indicator shape changes colors as lateral acceleration increases to a third level.

8. The lateral acceleration indicator of claim 7 wherein the first, second and third levels are selected to tailor indication for a specific aircraft.

9. The lateral acceleration indicator of claim 1 wherein the lateral acceleration indicator is implemented as part of a primary flight display.

10. A lateral acceleration indicator in an electronic display, the lateral acceleration indicator indicating lateral acceleration in an aircraft, the lateral acceleration indicator comprising:
    a fine tuning element, the fine tuning element including a centering mark and a floating mark for indicating the relatively small levels of lateral acceleration to a first level, the floating mark moving away from the center mark to indicate lateral acceleration; and
    a high level lateral acceleration element, the high level lateral acceleration element comprising an indicator shape, the indicator shape sliding as lateral acceleration increases past the first level, and wherein the sliding shape expands in size as the lateral acceleration increases past a second level to provide a stronger visual indication of relatively high levels of lateral acceleration.

11. The lateral acceleration indicator of claim 10 wherein the indicator shape changes colors as lateral acceleration increases to a third level.

12. The lateral acceleration indicator of claim 10 wherein the lateral acceleration indicator is implemented as part of a primary flight display.

13. A lateral acceleration indicator in an electronic display, the lateral acceleration indicator indicating lateral acceleration in an aircraft, the lateral acceleration indicator comprising:

a lateral acceleration indicator shape formed in the display, the lateral acceleration indicator shape expanding in size as lateral acceleration increases to indicate a current level of lateral acceleration.

14. The lateral acceleration indicator of claim 13 wherein the lateral acceleration indicator shape comprises a portion of a roll pointer in an attitude indicator.

15. The lateral acceleration indicator of claim 13 wherein the lateral acceleration indicator further includes a fine tuning element for indicating low levels of lateral acceleration, and wherein the fine tuning element comprises center mark and a floating mark, the floating mark moving away from the center mark to indicate lateral acceleration.

16. The lateral acceleration indicator of claim 13 wherein the lateral acceleration indicator shape changes colors as lateral acceleration further increases.

17. The lateral acceleration indicator of claim 13 wherein the lateral acceleration indicator is implemented as part of a primary flight display.

* * * * *